United States Patent
Dayasagar et al.

(12) 
(10) Patent No.: US 11,505,434 B2
(45) Date of Patent: Nov. 22, 2022

(54) ELEVATOR POWER MANAGEMENT SYSTEM AND METHOD

(71) Applicant: Otis Elevator Company, Farmington, CT (US)

(72) Inventors: Putla Vasudev Dayasagar, Telangana (IN); Pradeep Miriyala, Telangana (IN); Devendar Gorenkala, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 699 days.

(21) Appl. No.: 16/543,055

(22) Filed: Aug. 16, 2019

(65) Prior Publication Data
US 2020/0055702 A1 Feb. 20, 2020

(30) Foreign Application Priority Data
Aug. 16, 2018 (IN) .............................. 201811030749

(51) Int. Cl.
| | | |
|---|---|---|
| *B66B 11/00* | (2006.01) | |
| *B66B 1/34* | (2006.01) | |
| *B66B 5/00* | (2006.01) | |
| *B66B 5/28* | (2006.01) | |
| *B66B 13/22* | (2006.01) | |

(52) U.S. Cl.
CPC ........ *B66B 11/0005* (2013.01); *B66B 1/3446* (2013.01); *B66B 5/0031* (2013.01); *B66B 11/001* (2013.01); *B66B 5/284* (2013.01); *B66B 13/22* (2013.01)

(58) Field of Classification Search
CPC . B66B 11/0005; B66B 1/3446; B66B 5/0031; B66B 11/001; B66B 5/284; B66B 13/22; B66B 1/34; B66B 1/28; B66B 1/3461; B66B 2201/216; B66B 1/302; Y02B 50/00
See application file for complete search history.

(56) References Cited

U.S. PATENT DOCUMENTS

| 6,857,506 B1 | 2/2005 | Tyni et al. |
| 7,416,057 B2 | 8/2008 | Kostka |
| 9,016,440 B2 | 4/2015 | Finschi et al. |
| 2018/0093858 A1 | 4/2018 | Hughes et al. |

FOREIGN PATENT DOCUMENTS

| CN | 1906107 A | 1/2007 |
| CN | 101088896 A | 12/2007 |
| CN | 101708797 A | 5/2010 |
| CN | 201777742 U | 3/2011 |
| CN | 102328859 A | 1/2012 |

(Continued)

OTHER PUBLICATIONS

Chinese Office Action Issued in Chinese Application No. 201910754136.4 dated Jun. 30, 2021; 6 Pages.

(Continued)

*Primary Examiner* — Jeffrey Donels
(74) *Attorney, Agent, or Firm* — Cantor Colburn LLP

(57) ABSTRACT

Disclosed is an elevator system for a multi-level architectural structure, the elevator system having an elevator controller for an elevator in a hoistway, wherein the elevator controller effects a first determination of whether passengers or goods are in the elevator and effects a power mode for the elevator based on the first determination.

16 Claims, 5 Drawing Sheets

(56) References Cited

FOREIGN PATENT DOCUMENTS

| | | | |
|---|---|---|---|
| CN | 102444958 | A | 5/2012 |
| CN | 102992122 | A | 3/2013 |
| CN | 104724557 | A | 6/2015 |
| CN | 105967028 | A | 9/2016 |
| CN | 106006318 | A | 10/2016 |
| CN | 107879202 | A | 4/2018 |
| CN | 108147255 | A | 6/2018 |
| EP | 3290378 | A1 | 3/2018 |
| JP | 2008201497 | A | 9/2008 |
| JP | 2017-200850 | A | 11/2017 |
| TW | 542528 | B | 7/2016 |
| WO | 2010/040899 | A1 | 4/2010 |

OTHER PUBLICATIONS

European Patent Office, Extended European Search Report, Application No./Patent No. 19192153.5-1017/3611122, dated Feb. 3, 2020 (8 pp.).
Hakala, et al.; "Energy-Efficient Elevators for Tall Buildings"; Feb./Mar. 2001; Kone; Paper Presented at CTBUH 6th World Congress, Melbourne Australia; 13 pages.
Sniderman, Debbie; "Energy Efficient Elevator Technologies"; Sep. 2012; ASME; Retrieved from the Internet URL:https://www.asme.org/engineering-topics/articles/elevators/energy-efficient-elevator-technologies,3 pages.

ELEVATOR POWER MANAGEMENT SYSTEM AND METHOD

CROSS-REFERENCE TO RELATED APPLICATION

This application claims the benefit of Indian Patent Application No. 201811030749, filed Aug. 16, 2018, incorporated herein by reference in its entirety.

BACKGROUND

The embodiments herein relate to elevator systems and more specifically to a power management system for an elevator.

In an elevator with no passengers, power may be consumed by electronic and electrical appliances. During idle, park (PRK), park and shutdown (PKS) modes, electronic and electrical appliances may be turned on which consumes power.

BRIEF SUMMARY

Disclosed is an elevator system for a multi-level architectural structure, the elevator system comprising an elevator controller for an elevator in a hoistway, wherein the elevator controller effects a first determination of whether passengers or goods are in the elevator and effects a power mode for the elevator based on the first determination.

In addition to one or more of the features and elements disclosed in this document or as an alternate when the elevator controller determines there are no passengers within the elevator, the elevator controller effects a first power reduction mode of a plurality of power reduction modes, the first power reduction mode includes reducing electrical power for a first set of implements to respective preset levels, the first set of implements including one or more of (i) elevator lights, and (ii) air conditioning and ventilation systems.

In addition to one or more of the features and elements disclosed in this document or as an alternate when the elevator controller determines there are no passengers and no goods within the elevator, the elevator controller effects a second power reduction mode of the plurality of power reduction modes, the second power reduction mode includes (i) reducing electrical power for the first set of implements to the respective preset levels, and one or more of (ii) reducing electrical power to a call panel display within the elevator to a respective preset level and (iii) directing the elevator to a first level and parking the elevator at the first level.

In addition to one or more of the features and elements disclosed in this document or as an alternate when the elevator controller determines there are no passengers and there are goods within the elevator, the elevator controller effects a third power reduction mode of the plurality of power reduction modes, the third power reduction mode includes (i) reducing electrical power to the first set of implements to the respective preset levels and one or both of (ii) reducing electrical power to a call panel display in the elevator to a respective preset level, and (iii) continuing to transport the elevator a called level.

In addition to one or more of the features and elements disclosed in this document or as an alternate after the elevator controller effects one of the plurality of power reduction modes, when determining that one or more passengers are entering the elevator and/or an elevator door is opening, the elevator controller suspends the one of the plurality of power reduction modes.

In addition to one or more of the features and elements disclosed in this document or as an alternate the elevator contains a camera that may be controllable by the elevator controller, wherein the elevator controller determines from data transmitted from the camera whether there are one or more passengers in the elevator.

In addition to one or more of the features and elements disclosed in this document or as an alternate the elevator controller determines from data transmitted from the camera whether there are goods in the elevator.

In addition to one or more of the features and elements disclosed in this document or as an alternate in each of the plurality of power reduction modes, when there is no camera installed in the elevator, the elevator controller suspends elevator lights.

In addition to one or more of the features and elements disclosed in this document or as an alternate in each of the plurality of power reduction modes, when the camera is installed in the elevator, the elevator controller dims the lights to a level required for camera operation.

In addition to one or more of the features and elements disclosed in this document or as an alternate when the elevator controller communicates with a building maintenance service over a network power when entering any one of the power reduction modes.

Further disclosed is a method of operating an elevator system for a multi-level architectural structure, wherein the system includes one or more of the features and elements disclosed in this document.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
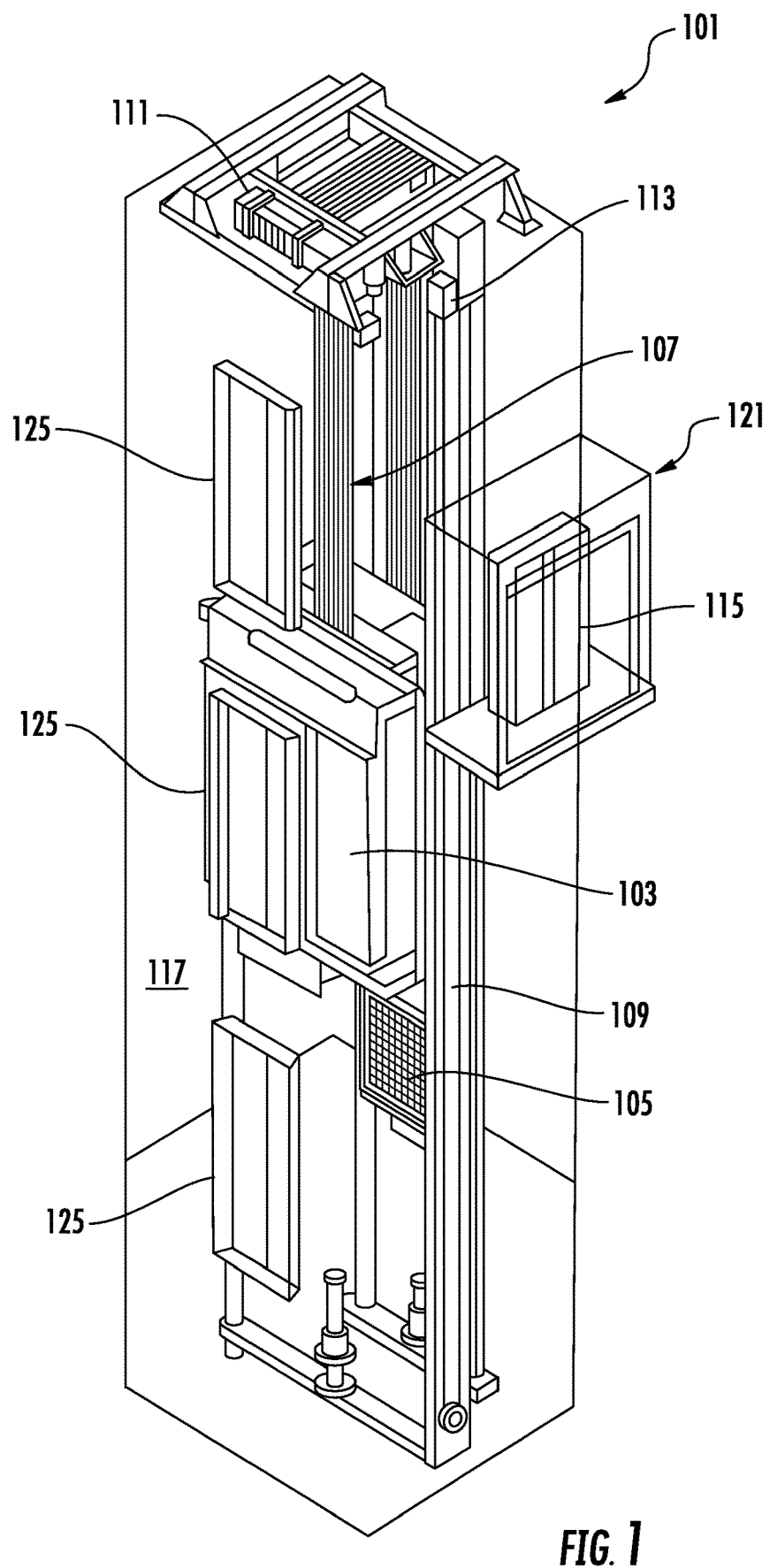
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109 in one embodiment, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
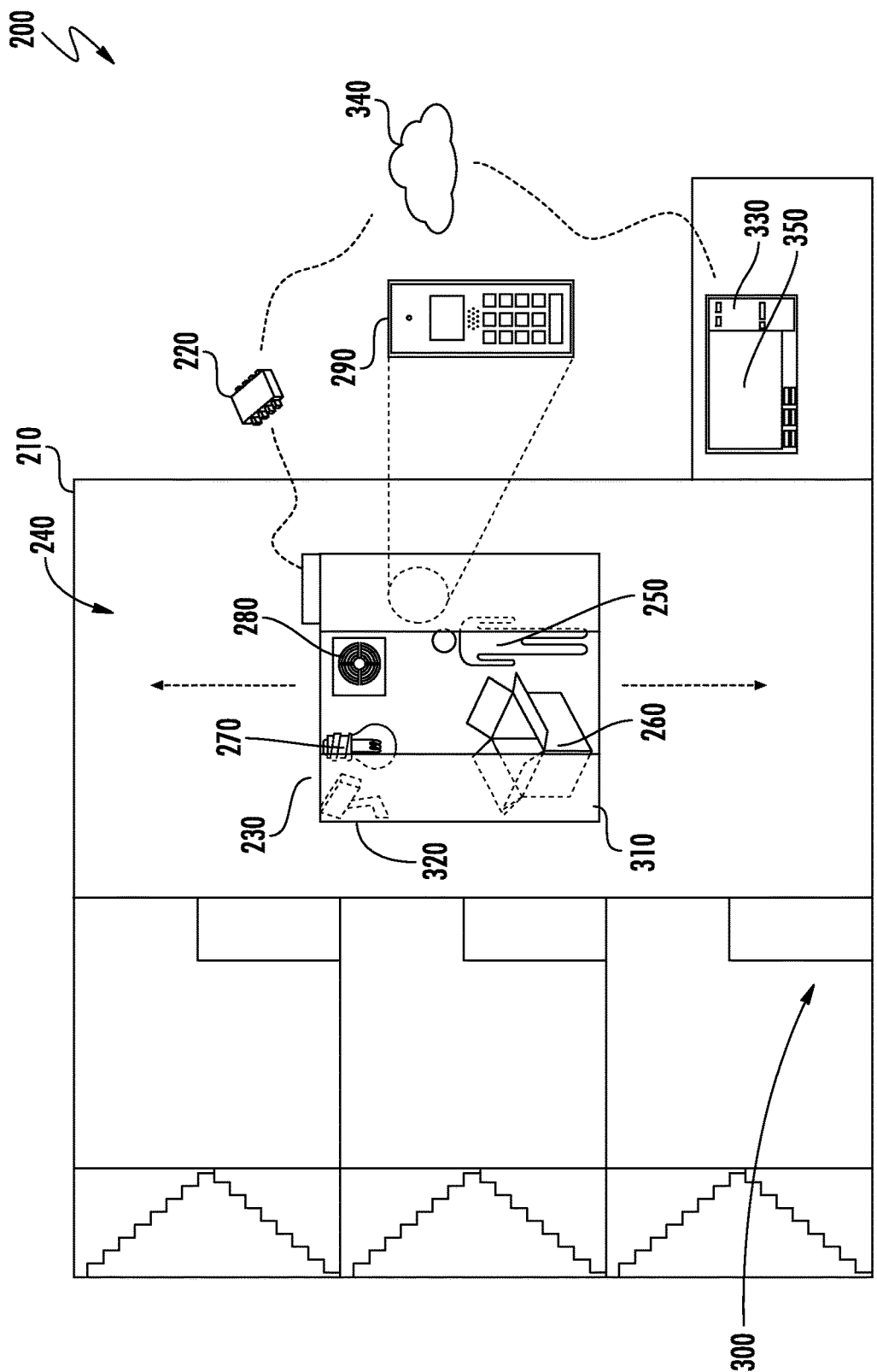
FIG. 2 illustrates components of one or more disclosed embodiment.

Turning to FIG. 2, disclosed is an elevator system 200 for a multi-level architectural structure 210. The elevator system 200 may comprise a first controller 220 that is an elevator controller for an elevator 230 in a hoistway 240.

Figure 3:
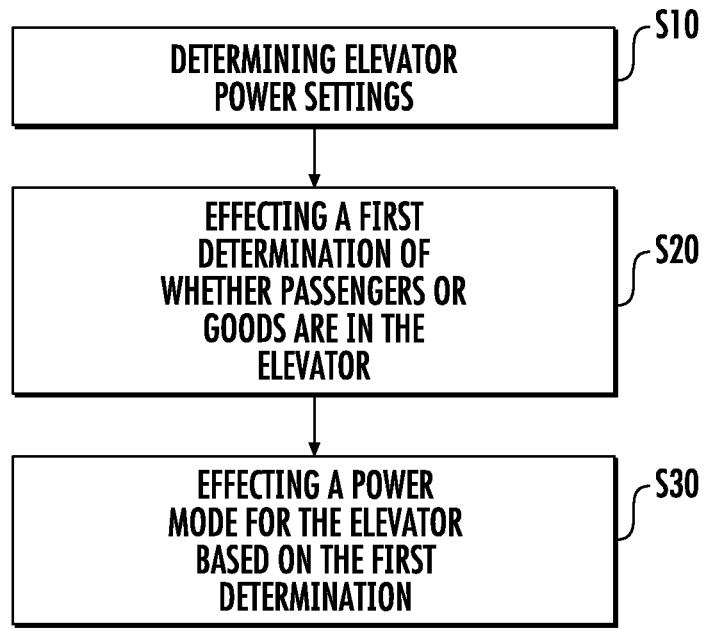
FIG. 3 illustrates a process performed by one or more of the disclosed embodiments.

With reference to FIGS. 2 and 3, while the elevator 230 is moving in the hoistway 240 in one embodiment, the first controller 220 may perform a first process S10 of determining elevator power settings. The first process S10 may include the step S20 of the first controller 220 effecting a first determination of whether passengers 250 or goods 260 are in the elevator 230. The first process S10 may include step S30 of the first controller 220 effecting a power mode for the elevator 230 based on the first determination.

Figure 4:
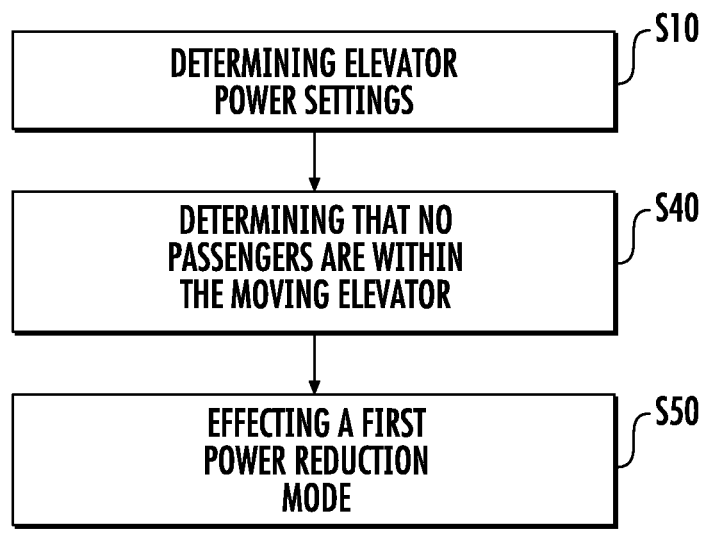
FIG. 4 illustrates another process performed by one or more of the disclosed embodiments.

With reference to FIGS. 2 and 4, while performing the first process S10, the first controller 220 may perform step S40 of determining that no passengers 250 are within the moving elevator 230 in one embodiment. Then the first controller 220 may perform step S50 of effecting a first power reduction mode of a plurality of power reduction modes. The first power reduction mode may comprise reducing electrical power for a first set of implements to respective preset levels. The first set of implements may include one or more of (i) elevator lights 270 and (ii) air conditioning and ventilation systems 280.

Figure 5:
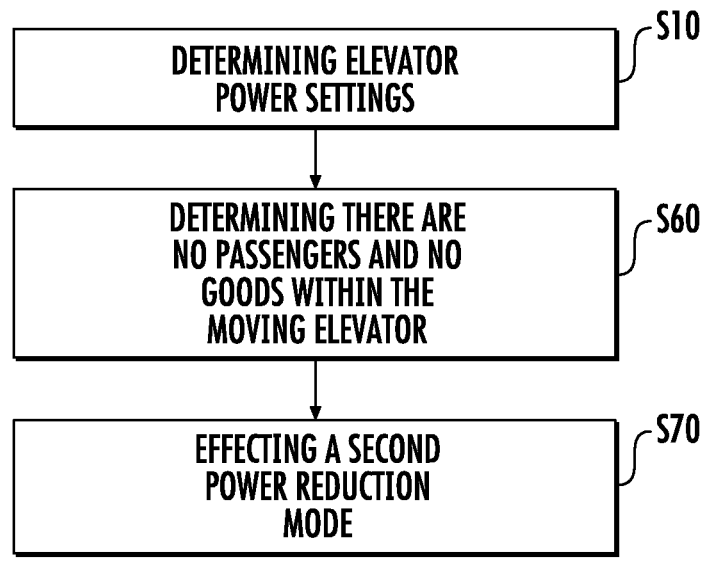
FIG. 5 illustrates another process performed by one or more of the disclosed embodiments.

With reference to FIGS. 2 and 5, while performing the first process S10, the first controller 220 may perform step S60 of determining there are no passengers 250 and no goods 260 within the moving elevator 230 in one embodiment. Then the first controller 220 may perform step S70 of effecting a second power reduction mode of the plurality of power reduction modes. The second power reduction mode may include (i) reducing electrical power for the first set of implements to the respective preset levels, and one or more of (ii) reducing electrical power to a call panel display 290 in the elevator 230 to a respective preset level, and (iii) directing the elevator 230 to a first level 300, which may be a lobby, and parking the elevator 230 at the first level 300.

Figure 6:
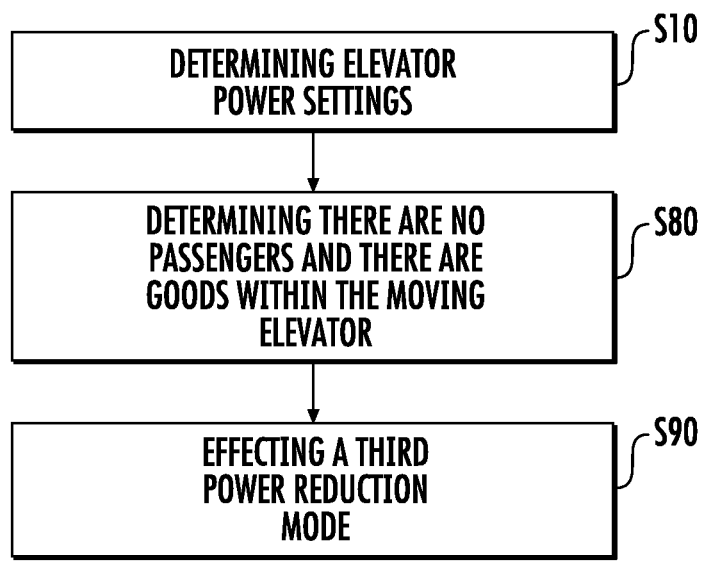
FIG. 6 illustrates another process performed by one or more of the disclosed embodiments.

With reference to FIGS. 2 and 6, while performing the first process S10, the first controller 220 may perform step S80 of determining there are no passengers 250 and there are goods 260 within the moving elevator 230 in one embodiment. Then the first controller 220 may perform step S90 of effecting a third power reduction mode of the plurality of power reduction modes. The third power reduction mode may include (i) reducing electrical power to the first set of implements to the respective predetermined levels, and one or both of (ii) reducing electrical power to a call panel display 290 in the elevator 230 to a respective preset level, and (iii) continuing to transport the elevator 230 to a called level.

Figure 7:
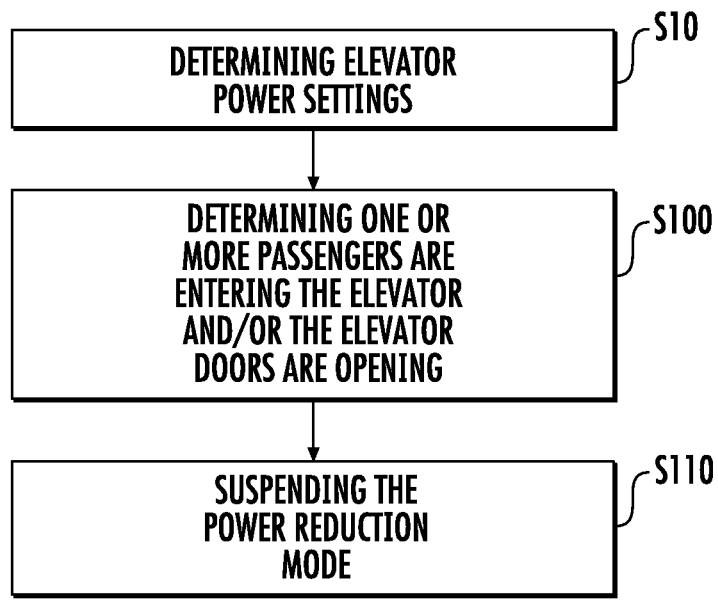
FIG. 7 illustrates another process performed by one or more of the disclosed embodiments.

With reference to FIGS. 2 and 7, while performing the first process S10, after the first controller 220 effects one of the plurality of power reduction modes, the first controller 220 may perform step S100 of determining one or more passengers 250 are entering the elevator 230 and/or an elevator door 310 is opening. Then the first controller 220 may perform step S110 of suspending the one of the plurality of power reduction modes.

With reference to FIG. 2, the elevator 230 may contain a camera 320, which may be a video camera, which may be controllable by the first controller 220. Wherein the first controller 220 determines from data transmitted from the camera 320 whether there are one or more passengers 250 in the elevator 230. In addition, the first controller 220 may determine from data transmitted from the camera 320 whether there are goods 260 in the elevator 230.

According to an embodiment, in each of the power reduction modes, when there is no camera 320 installed in the elevator 230, the first controller 220 suspends the elevator lights 270. According to an embodiment, in each of the power reduction modes, when the camera 320 is installed in the elevator 230, the first controller 220 dims the lights 270 to a level required for camera operation.

Figure 8:
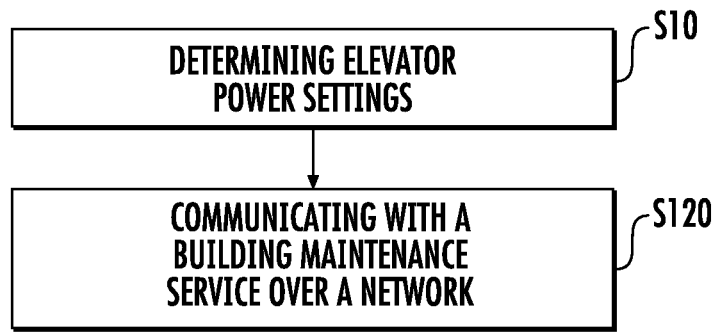
FIG. 8 illustrates another process performed by one or more of the disclosed embodiments.

With reference to FIGS. 2 and 8, while performing the first process S10, after the first controller 220 effects one of the plurality of power reduction modes, the first controller 220 may perform step S120 of communicating with an electronic building maintenance service (BMS) 330 over a network 340. This communication may occur when entering any one of the power reduction modes. Accordingly building management may be apprised of elevator activities. For example, the service may display such elevator mode changes on a display 350 located at the BMS.

With the above disclosed embodiments, by detecting a number of passengers inside elevator car at a time of elevator dispatch, several electrical and electronic appliances may be moved to a sleep mode or turned to an OFF mode for power saving. Similarly, during IDLE, PRK and PKS modes, some of electronic appliances may be turned to an OFF mode. A top view camera 320 with image processing unit may provide a number of passengers (using head count). A camera may be useful when elevator is used only for goods transport.

It is to be appreciated that the above disclosed features and benefits may be obtained in embodiments wherein the processes are performed within an elevator that is in motion and/or not in motion.

The above disclosed embodiments may save power when an elevator is in an IDLE mode. The above disclosed embodiments may save power, in one embodiment while an elevator is moving to a landing with no passengers. The above disclosed embodiments may be relatively energy efficient and eco-friendly.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/ or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system for a multi-level architectural structure, the elevator system comprising
    an elevator controller for an elevator in a hoistway, wherein the elevator controller effects a first determination of whether passengers or goods are in the elevator and effects a power mode for the elevator based on the first determination,
    wherein:
    when the elevator controller determines there are no passengers within the elevator, the elevator controller effects a first power reduction mode of a plurality of power reduction modes, the first power reduction mode includes reducing electrical power for a first set of implements to respective preset levels, the first set of implements including one or more of (i) elevator lights, and (ii) air conditioning and ventilation systems; and
    when the elevator controller determines there are no passengers and no goods within the elevator, the elevator controller effects a second power reduction mode of the plurality of power reduction modes, the second power reduction mode includes (i) reducing electrical power for the first set of implements to the respective preset levels, and one or more of (ii) reducing electrical power to a call panel display within the elevator to a respective preset level and (iii) directing the elevator to a first level and parking the elevator at the first level.

2. The system of claim 1 wherein when the elevator controller determines there are no passengers and there are goods within the elevator, the elevator controller effects a third power reduction mode of the plurality of power reduction modes,
    the third power reduction mode includes (i) reducing electrical power to the first set of implements to the respective preset levels and one or both of (ii) reducing electrical power to a call panel display in the elevator to a respective preset level, and (iii) continuing to transport the elevator a called level.

3. The system of claim 2 wherein after the elevator controller effects one of the plurality of power reduction modes, when determining that one or more passengers are entering the elevator and/or an elevator door is opening, the elevator controller suspends the one of the plurality of power reduction modes.

4. The system of claim 3 wherein the elevator contains a camera that may be controllable by the elevator controller, wherein the elevator controller determines from data transmitted from the camera whether there are one or more passengers in the elevator.

5. The system of claim 4 wherein the elevator controller determines from data transmitted from the camera whether there are goods in the elevator.

6. The system of claim 5 wherein in each of the plurality of power reduction modes, when there is no camera installed in the elevator, the elevator controller suspends elevator lights.

7. The system of claim 6 wherein in each of the plurality of power reduction modes, when the camera is installed in the elevator, the elevator controller dims the lights to a level required for camera operation.

8. The system of claim 7 wherein when the elevator controller communicates with a building maintenance service over a network power when entering any one of the power reduction modes.

9. A method of operating an elevator system for a multi-level architectural structure, wherein
the elevator system includes an elevator controller for an elevator in a hoistway, and
the method comprises:
the elevator controller effects a first determination of whether passengers or goods are in the elevator and effects a power mode for the elevator based on the first determination,
wherein:
when the elevator controller determines there are no passengers within the elevator, the elevator controller effects a first power reduction mode of a plurality of power reduction modes, the first power reduction mode includes reducing electrical power for a first set of implements to respective preset levels, the first set of implements including one or more of (i) elevator lights, and (ii) air conditioning and ventilation systems; and
when the elevator controller determines there are no passengers and no goods within the elevator, the elevator controller effects a second power reduction mode of the plurality of power reduction modes, the second power reduction mode includes (i) reducing electrical power for the first set of implements to the respective preset levels, and one or more of (ii) reducing electrical power to a call panel display within the elevator to a respective preset level and (iii) directing the elevator to a first level and parking the elevator at the first level.

10. The method of claim 9 wherein when the elevator controller determines there are no passengers and there are goods within the elevator, the elevator controller effects a third power reduction mode of the plurality of power reduction modes,
the third power reduction mode includes (i) reducing electrical power to the first set of implements to the respective preset levels and one or both of (ii) reducing electrical power to a call panel display in the elevator to a respective preset level, and (iii) continuing to transport the elevator a called level.

11. The method of claim 10 wherein after the elevator controller effects one of the plurality of power reduction modes, when determining that one or more passengers are entering the elevator and/or an elevator door is opening, the elevator controller suspends the one of the plurality of power reduction modes.

12. The method of claim 11 wherein the elevator contains a camera that may be controllable by the elevator controller, wherein the elevator controller determines from data transmitted from the camera whether there are one or more passengers in the elevator.

13. The method of claim 12 wherein the elevator controller determines from data transmitted from the camera whether there are goods in the elevator.

14. The method of claim 13 wherein in each of the plurality of power reduction modes, when there is no camera installed in the elevator, the elevator controller suspends elevator lights.

15. The method of claim 14 wherein in each of the plurality of power reduction modes, when the camera is installed in the elevator, the elevator controller dims the lights to a level required for camera operation.

16. The method of claim 15 wherein when the elevator controller communicates with a building maintenance service over a network power when entering any one of the power reduction modes.

* * * * *